(12) United States Patent
Sian et al.

(10) Patent No.: US 12,456,515 B2
(45) Date of Patent: Oct. 28, 2025

(54) PHOTONIC CONTENT ADDRESSABLE MEMORY

(71) Applicant: Oxford University Innovation Limited, Oxford (GB)

(72) Inventors: James Tan You Sian, Oxford (GB); Harish Bhaskaran, Oxford (GB); Johannes Feldmann, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 131 days.

(21) Appl. No.: 18/572,227

(22) PCT Filed: Jun. 14, 2022

(86) PCT No.: PCT/GB2022/051499
§ 371 (c)(1),
(2) Date: Dec. 20, 2023

(87) PCT Pub. No.: WO2023/275509
PCT Pub. Date: Jan. 5, 2023

(65) Prior Publication Data
US 2024/0296886 A1    Sep. 5, 2024

(30) Foreign Application Priority Data
Jun. 28, 2021 (GB) ...................... 2109302

(51) Int. Cl.
*G11C 15/04* (2006.01)
*G11C 13/00* (2006.01)
*G11C 15/00* (2006.01)

(52) U.S. Cl.
CPC .......... *G11C 13/0004* (2013.01); *G11C 15/00* (2013.01); *G11C 15/046* (2013.01)

(58) Field of Classification Search
CPC .... G11C 13/0004; G11C 15/00; G11C 15/046
See application file for complete search history.

(56) References Cited

U.S. PATENT DOCUMENTS

| 8,027,587 B1 | 9/2011 | Watts |
| 8,943,374 B2 * | 1/2015 | Lam ....................... G11C 29/44 365/49.1 |

(Continued)

FOREIGN PATENT DOCUMENTS

| WO | 2020/254781 A1 | 12/2020 | |
| WO | WO-2024001455 A1 * | 1/2024 | ........... G02F 1/0009 |

OTHER PUBLICATIONS

Quashef, M.A.Z., Alam, M. Ultracompact photonic integrated content addressable memory using phase change materials. Optical and Quantum Electronics, vol. 54, article No. 182 (Feb. 26, 2022). (Year: 2022).*

(Continued)

*Primary Examiner* — Jay W. Radke
(74) *Attorney, Agent, or Firm* — Thomas|Horstemeyer, LLP

(57) ABSTRACT

A photonic content addressable memory (CAM) (100) is provided. The photonic CAM (100) comprises: N search lines (101) and a plurality of match lines (102), each match line comprising N photonic CAM cells (110). Each search line (101) is configured to receive a search optical signal and each search optical signal comprises a different wavelength encoding one of N parallel search symbols. Each match line (102) is configured to receive: a wavelength division multiplexed content optical signal comprising a plurality of wavelengths, each wavelength encoding one of N parallel content symbols; and the N search optical signals from the N search lines (101). Each photonic CAM cell is configured to compare a respective search symbol with a respective content symbol and provide an output optical signal that is (Continued)

responsive to the comparison. Each match line (102) also comprises a content optical demultiplexer (120), configured to demultiplex the wavelength division multiplexed content optical signal and provide each CAM cell (110) with the respective content symbol.

20 Claims, 7 Drawing Sheets

(56) References Cited

U.S. PATENT DOCUMENTS

| | | | |
|---|---|---|---|
| 10,068,606 | B2 | 9/2018 | Bhaskaran et al. |
| 2010/0061138 | A1 | 3/2010 | Song et al. |
| 2021/0050060 | A1* | 2/2021 | Li .................. G11C 7/1006 |
| 2024/0119999 | A1* | 4/2024 | Syed ................ G11C 15/04 |

OTHER PUBLICATIONS

International Search Report and Written Opinion for WO 2023/275509 (PCT/GB2022/051499), dated Oct. 25, 2022, pp. 1-8.
UK Search Report for GB 2109302.6, dated Nov. 25, 2021, pp. 1-2.
Pitris Stelios et al: "An Optical Content Addressable Memory Cell for Address Look-Up at 10 Gb/s", IEEE Photonics Technology Letters, IEEE, USA, vol. 28, No. 16, Aug. 15, 2016 (Aug. 15, 2016), pp. 1790-1793.
Alkabani Yousra et al: "OE-CAM: A Hybrid Opto-Electronic Content Addressable Memory", IEEE Photonics Journal, IEEE, USA, vol. 12, No. 2, Jan. 15, 2020 (Jan. 15, 2020), pp. 1-14.
Maniatis et al., 'A 16GHz optical cache memory architecture for set-associative mapping in chip multiprocessors', IEEE 2014 Optical Fiber Communications Conference and Exhibition (OFC), Mar. 9-13, 2014, pp. 1-3.
Ha, Berlin, and Yao Li. "Parallel modified signed-digit arithmetic using an optoelectronic shared content-addressable-memory processor." Applied optics 33.17 (1994): 3647-3662.
Hopfield, John J., and David W. Tank. "Computing with neural circuits: A model." Science 233.4764 (1986): 625-633.
Hanlon, A. G. "Content-addressable and associative memory systems a survey." IEEE Transactions on Electronic Computers 4 (1966): 509-521.
Jang, Heesuk, et al. "Comb-rooted multi-channel synthesis of ultra-narrow optical frequencies of few Hz linewidth." Scientific reports 9.1 (2019): 7652.
Kang, Hyun Jay, et al. "Free-space transfer of comb-rooted optical frequencies over an 18 km open-air link." Nature communications 10.1 (2019): 4438.
Rios, Carlos, et al. "Integrated all-photonic non-volatile multi-level memory." Nature photonics 9.11 (2015): 725-732.
Rios, Carlos, et al. "On-chip photonic memory elements employing phase-change materials." (2013).
Graves, Catherine E., et al. "In-memory computing with memristor content addressable memories for pattern matching." Advanced Materials 32.37 (2020): 2003437.
Krishnamoorthy, Ashok V., et al. "Photonic content-addressable memory system that uses a parallel-readout optical disk." Applied optics 34.32 (1995): 7621-7638.
LaMacchia, J. T., and C. J. Vincelette. "Comparison of the diffraction efficiency of multiple exposure and single exposure holograms." Applied Optics 7.9 (1968): 1857-1858.
Vagionas, Christos, et al. "Integrated optical content addressable memories (CAM) and optical random access memories (RAM) for ultra-fast address look-up operations." Applied Sciences 7.7 (2017): 700.
Alexoudi, Theoni, George Theodore Kanellos, and Nikos Pleros. "Optical RAM and integrated optical memories: a survey." Light: Science & Applications 9.1 (2020): 91.
Mourgias-Alexandris, George, et al. "A 10Gb/s All-Optical Matchline for optical Content Addressable Memory CAM Rows." Optical Fiber Communication Conference. Optica Publishing Group, 2018.
Mourgias-Alexandris, George, et al. "Optical content addressable memory matchline for 2-bit address look-up at 10 Gb/s." IEEE Photonics Technology Letters 30.9 (2018): 809-812.
Vagionas, Christos, et al. "Optical memory architectures for fast routing address look-up (AL) table operation." Journal of Physics: Photonics 1.4 (2019): 044005.
Pitris, Stelios, et al. "First demonstration of an optical Content Addressable Memory (CAM) cell at 10 Gb/s." Optical Fiber Communication Conference. Optica Publishing Group, 2016.

\* cited by examiner

PHOTONIC CONTENT ADDRESSABLE MEMORY

CROSS-REFERENCE TO RELATED APPLICATIONS

This application is the National Stage of International Application No. PCT/GB2022/051499, filed Jun. 14, 2022, which claims priority to GB 2109302.6, filed Jun. 28, 2021, which are entirely incorporated herein by reference.

TECHNICAL FIELD

This invention relates to a photonic content addressable memory. Particularly, but not exclusively, the invention relates to an all optical content addressable memory.

BACKGROUND TO THE INVENTION

A content addressable memory (CAM), also known as associative memory, is a type of computer memory that operates a hardware search engine. Unlike a standard computer memory such as random access memory (RAM), in which the user supplies a memory address and the RAM returns the data (also referred to as a data word) stored at that address, data stored in a CAM is accessed by searching for the specific data content itself. A user supplies an input search data word to the CAM and the CAM compares the input search data word to a table of stored data words (the content) and returns the table address of a matching data word. The data content can then be accessed by providing the matching table address(es) to a RAM, cache memory, or by other memory, as is known in the art.

A CAM typically comprises an array of memory elements (CAM cells) arranged in rows, or match lines, which are accessed simultaneously and in parallel. Each row of CAM cells stores the bits of a data word, and the bits of the input search data word are sent to respective columns of the CAM array for bit-wise comparison to each stored data word. A CAM can operate as a binary CAM, using search data words consisting of 1s and 0s, a ternary CAM which further accommodates a third matching state X of "don't care" for one or more bits of the stored data word so that these bits are not considered in the comparison, or an analogue CAM which can take as input either digital or analogue search values.

Because of its parallel searching nature, a CAM is capable of searching its entire contents in a single clock cycle, and is orders of magnitude faster than RAM for searching. CAM has wide ranging applications in practically anything that involves searching of databases. Common examples include basic searching (e.g. address look-up tables for fast network routing applications), data correlations, parallel computations and machine learning.

Common implementations of CAMs utilise electronic circuits and components, such as CMOS based CAM cells, which suffer from large area (when spatial multiplexed), cost, power consumption, noise and latency (compared to optical line rates), particularly as the CAM is scaled up. Hybrid optoelectronic CAMs are an emerging technology which leverage high speed optical routing of data in combination with relative mature electronic control architectures, and are a promising candidate for replacing the relatively slow performing electronic counterparts, particularly in optical networks.

A 2-bit optoelectronic CAM match line architecture has been demonstrated to operate at 10 Gbs$^{-1}$ based on optical fibre connected CAM cells formed of a semiconductor optical amplifier (SOA) Mach-Zehnder Interferometer (MZI) flip-flop memory element for storing the data bit and a SOA-MZI XOR-based logic gate for comparison between a stored bit and a search bit (see, C. Vagionas et al., "Optical memory architectures for fast routing address look-up (AL) table operation", in Journal of Physics Photonics 1, 044005, (2019)). The optical CAM operates as follows. A "content" optical signal encoding a content bit at $\lambda_1$ is provided to each SOA-MZI memory element to write data thereto, and a "search" optical signal encoding a search bit at $\lambda_3$ is provided to the SOA-XOR logic gate for comparison to the stored bits. The SOA-XOR gate of each CAM cell is driven by separate laser beams at different wavelengths $\lambda_4$, $\lambda_5$ and their outputs, encoded at $\lambda_4$ and $\lambda_5$, respectively, are multiplexed by means of an arrayed waveguide grating (AWG) to produce a wavelength division multiplexed (WDM) match line response signal in which the outcome of each search-bit operation is designated by a different wavelength which can then be filtered and processed.

The above work demonstrates an important proof of principle for achieving all optical CAM functionality at fast read/write rates up to 10 Gbs$^{-1}$, but it does not address the problem of cost, power consumption and scalability. In particular, the separate CAM cells are connected via optical fibres, and the SOA-based architecture requires multiple on-chip SOAs which are bulky (on the millimetre scale size), emit at a wavelength dictated by their gain medium, and require high electrical currents to operate, which is not suitable for scaling up and fully on-chip integration. In particular, as the number of CAM cells is increased, the number of SOAs, fibre interconnects and waveguides sending the output signals to the AWG increases, making the system quickly grow in size, complexity and power consumption upon scaling up. Alternative all optical architectures and technologies are required to achieve a scalable and fully on-chip integrated optical CAM array.

Aspects and embodiments of the present invention have been devised with the foregoing in mind.

SUMMARY OF THE INVENTION

According to a first aspect of the invention, there is provided a photonic content addressable memory (CAM) or CAM array. The CAM comprises a plurality, N, of search lines and a plurality, M, of match lines. Each search line is configured to receive a search optical signal. Each search optical signal comprises a different wavelength encoding one of N search symbols or bits. The search symbols or bits may be referred to as parallel, in that different wavelengths are sent to different search lines simultaneously. Each match line is configured to receive a wavelength division multiplexed (WDM) content optical signal. The WDM signal comprises a plurality of wavelengths, each wavelength encoding one of N content symbols or bits. The content symbols or bits may be referred to as parallel, in that the different wavelengths encoding different data are sent to the same match line simultaneously. Each match line is also configured to receive the N search optical signals from the N search lines. Each match line comprises N CAM cells, each configured to compare a respective search symbol with a respective content symbol and provide an output optical signal that is responsive to the comparison. The CAM cells may be photonic CAM cells. The CAM cells may be arranged in rows and columns, each row associated with a match line, and each column associated with a search line. Each match line further comprises a content optical demultiplexer, configured to demultiplex the wavelength division multiplexed content optical signal and provide each CAM cell with the respective content symbol. Each match line may further comprise a response multiplexer, configured to combine the output optical signal from each of the N CAM cells to form a wavelength division multiplexed response optical signal.

In this context, a symbol or bit represents a state of the optical signal, e.g. defined its amplitude, phase and/or modulation frequency, as is known in the art (e.g. examples of suitable signal modulation schemes include, but are not limited to: quadrature phase shift keying (QPSK), 8 phase shift keying (8PSK), 16 quadrature amplitude modulation (QAM), 16 amplitude and phase-shift keying or asymmetric phase shift keying (APSK), 32 QAM, 32 APSK, 64 QAM, 64 APSK, 256 QAM, 256 APSK, etc.). Each symbol can encode/represent a bit of digital information or a number/group of bits.

The N content symbols encoded in the WDM content optical signal on each match line may represent a stored data word. The N search symbols encoded in the N search optical signals may represent a search data word.

Each match line may further comprise a content optical signal waveguide, configured to communicate the wavelength division multiplexed content signal to the content optical demultiplexer.

Each search line may comprise a search optical signal waveguide, configured to communicate a respective search optical signal to each match line. Each search optical signal waveguide may be coupled to a CAM cell of each match line to provide the same search symbol to each of the respective CAM cells.

The photonic CAM of the invention provides for all-parallel search operations in a manner than can be scaled up without a commensurate increase in power consumption, cost and size. Each content symbol is provided to each CAM cell in the row or match line in parallel, and each search symbol is provided to each CAM cell in a column in parallel. The use of separate distinct wavelengths for encoding each input content symbol/bit of a data word means that they can be provided to the row of CAM cells in parallel on a single waveguide using WDM, rather than serially. This allows the match lines and search lines to be arranged in the most compact way. The photonic CAM can be fully implemented on-chip on a photonic platform, using photonic circuits to controllably route light to and from the CAM cells through a network of optical waveguides e.g. using various filtering, switching and power splitting photonic devices, thus avoiding the need for optical fibers and interconnects between CAM cells. The CAM cell themselves can be also be implemented using microscale photonic elements, with all optical memory elements, avoiding the need to use large and power hungry on-chip lasers (i.e. in the form of semiconductor optical amplifiers, SOAs). In addition, latency (i.e. the time to complete a search operation) is decreased due to the nature of the all-parallel CAM cell search operations on the photonic platform. For example, in a binary search operation, the order of complexity is reduced from $O(\log_2 n)$ to $O(1)$, because it is a one shot process. In other words, the time to perform the search operation is both reduced and independent of the number of input search bits.

Although electronic all-parallel CAMs can be built by explicitly configuring multiple electronic signals to run in parallel, they become prohibitively expensive and complex as the CAM array is scaled up. By contrast, optical signals are ideal to exploit such parallelism, since optical signals can be multiplexed onto a single optical waveguide using different optical wavelengths with no interference (i.e. WDM). This increases signal bandwidth by allowing different data streams to be sent simultaneously over a single optical waveguide, as long as the data streams are of unique wavelengths. For example, a commercial femtosecond Erbium-doped fiber oscillator (C-fiber, Menlo Systems GmbH) can readily provide $10^5$ wavelength modes evenly distributed over a 75 nm spectral bandwidth, providing a single optical source from which a plurality of optical signals at different wavelengths can be extracted. A frequency comb light source thus provides a very broad wavelength choice, suitable for the present application. This is in contrast to prior art approaches using SOAs in which the wavelengths are dictated/limited by the gain medium of the SOAs, which is not practical for scaling up the CAM, particularly if WDM is used.

The wavelength of the content symbol and the search symbol received at a respective CAM cell may be different to each other. This prevents or minimises unwanted optical phase dependence of the comparison that may occur if the two wavelengths are the same.

The content optical demultiplexer may comprises N content filters, each configured to couple a portion of the spectral content of the wavelength division multiplexed content signal associated with a respective content symbol to the respective CAM cell. Optionally or preferably, each content filter is coupled between the content optical signal waveguide and a respective CAM cell.

Each content filter may comprise an optical resonator, optionally or preferably, a ring resonator.

Each match line may further comprise N search couplers. Each search coupler may be configured to couple a portion of the optical power in a respective search optical signal waveguide to a respective CAM cell. Optionally or preferably, each search coupler is coupled between a respective search optical signal waveguide and a respective CAM cell.

Each search coupler may comprise a directional coupler. The directional coupler may be formed from a portion of the search optical signal waveguide and a portion of a first optical waveguide configured to provide a respective search symbol to a respective CAM cell. The portion of the search optical signal waveguide and the portion of the first optical waveguide may be substantially parallel, evanescently coupled and separated by a gap.

The CAM may further comprise a search optical demultiplexer. The search optical demultiplexer may be configured to demultiplex a wavelength division multiplexed search optical signal comprising a plurality of wavelengths encoding the N parallel search symbols, for providing each search symbol to a respective search line.

Each match line may comprise a response optical signal waveguide configured to receive the response optical signal from the response multiplexer. The response multiplexer may comprises N response couplers, each response coupler configured to couple the output optical signal of a respective CAM cell to the response optical signal waveguide. Optionally or preferably, each response coupler is coupled between the response optical signal waveguide and a respective CAM cell.

Each response coupler may comprise a directional coupler. The directional coupler may be formed from a portion of the response optical signal waveguide and a portion of a third optical waveguide configured to provide the output optical signal from a respective CAM cell. The portion of the response optical signal waveguide and the portion of the third optical waveguide may be substantially parallel, evanescently coupled and separated by a gap.

Each CAM cell may further comprise a memory or modulating element that modifies a transmission property of the CAM cell dependent on the state of the memory/modulating element. The modulating element may be configured to be switchable between two or more stable states having a different refractive index in each stable state for a given wavelength of light. The modulating element may be a non-volatile modulating element.

Each CAM cell may be configured to adjust the state of the modulating element in dependence on a matching between the search symbol and the content symbol. In one example, the degree of matching between the search symbol and the content symbol may vary the optical power of an optical signal provided to and/or which can couple to the modulating element. The state of the modulating element may be changed or altered/adjusted in response to the optical signal provided and/or coupled to the modulating element being above a threshold optical power.

The modulating element may be or comprise, or be coupled to an optical waveguide of the CAM cell. The modulating element may be provided on or over a portion of, and/or form a portion of, an optical waveguide of the CAM cell. The modulating element may be configured to evanescently couple to light guided, or an optical field carried, by the optical waveguide. The modulating element may be configured to modulate a phase and/or amplitude of light guided, or an optical field carried, by the optical waveguide of the CAM cell.

The modulating element may be or comprise a phase change material (PCM). The PCM may be switchable between at least two stable (solid) states having a different refractive index in each stable state for a given wavelength of light. Each state of the PCM corresponds to a different effective refractive index and phase-shifting character of a waveguide on which the PCM is provided, thus changing the amplitude and/or phase shift imparted on the light propagating through the optical waveguide. The PCM may be switchable in response to a change in temperature of the PCM and/or application of heat thereto. The PCM may be switched optically. Optical switching may be achieved by an incident optical pulse, or guided light with sufficient power to switch/heat or change an optical property of the PCM.

The PCM may be incrementally switchable between a first state and a second state, e.g. having a plurality of intermediate states between the first and second states. The at least two stable solid states may include an amorphous state and a crystalline state. The plurality of intermediate states may be partially crystalline or partially amorphous states. The PCM may be formed of or comprise $Ge_2Sb_2Te_5$ (GST), $Ge_2Sb_2Se_xTe_{5-x}$ (GSST), or antimonide trisulphide ($Sb_2S_3$). Alternatively or additionally, the PCM may be formed of or comprise a compound, or an alloy of a combination of elements, selected from the following list of compounds: GeSbTe, $VO_x$, $NbO_x$, GeTe, GeSb, GaSb, AgInSbTe, InSb, InSbTe, InSe, SbTe, TeGeSbS, AgSbSe, SbSe, GeSbMnSn, AgSbTe, AuSbTe, and AlSb.

Each CAM cell may comprise a first optical waveguide configured to carry the search symbol and a second optical waveguide configured to carry the content symbol. The first optical waveguide may be coupled to the search coupler and/or form a portion of the search coupler to receive a search symbol from a search line. The second optical waveguide may be coupled to a respective content filter to receive a content symbol from a match line. Each CAM cell may further comprise a third optical waveguide configured to carry the output optical signal. The third optical waveguide may be coupled to a respective response coupler.

Each CAM cell may comprise a cascaded first and second directional coupler formed from a portion of the first waveguide and second waveguide, in which the first waveguide and second waveguides are substantially parallel, evanescently coupled and separated by a gap. The modulating element may be evanescently coupled to the second waveguide in the second directional coupler and arranged to modify a transmission or absorption characteristic of the second waveguide dependent on the state of the modulating element. The state of the modulating element may be adjustable between a first and second state by an optical field carried by the first and/or second waveguide. The modulating element may be able to modify the amount of coupling between the first and second waveguides in the second directional coupler dependent on the state of the modulating element.

The CAM or first and second directional couplers may be arranged to accumulate optical intensity in the second waveguide at the interface between the first and second directional couplers when both the first and second waveguides carry optical fields contemporaneously, i.e. when the optical fields carried by the first and second waveguides are substantially overlapping in time. For example, the first directional coupler may be arranged such that when a first optical field is carried by the first waveguide and contemporaneously a second optical field is carried by the second waveguide, the first directional coupler transfers at least a portion of the intensity of the first optical field from the first waveguide to the second waveguide, such that the total optical intensity in the second waveguide at the interface between the first and second directional couplers is greater than the total optical intensity in the second waveguide at the start of the first directional coupler.

In this manner, the net optical energy/intensity from both the search and content symbols is converged in the second waveguide of the first coupler. This can cause a fractional volume of the modulating element to be switched to a different state. For example, where the modulating element comprises a phase change material (PCM) and the converged optical energy/intensity causes a fractional volume of the PCM to be switched from a crystalline state to an amorphous state (or vice versa). With more converging optical fields (e.g. pulses), a larger volume of material of the modulating element switches from crystalline to amorphous which modifies a transmission property of the CAM cell and alters the output optical signal of the CAM cell.

The CAM cell may be configured as a binary CAM cell, a ternary CAM cell, or analogue CAM cell.

The CAM may be fabricated from one or more materials selected from the group comprising: silicon (Si), silicon oxide ($SiO_2$), silicon nitride (SiN), indium phosphide (InP), gallium phosphide (GaP), germanium (Ge), lithium niobate ($LiNbO_3$), aluminium nitride (AlN), or any group IV or III-V semiconductor with a band gap higher than the wavelength of light.

According to a second aspect of the invention, there is provided a method of performing a search operation in a photonic content addressable memory (CAM) comprising N search lines and a plurality of match lines, each match line having N photonic CAM cells. The CAM may be the CAM of the first aspect and comprise any or all the features thereof. The method may comprise providing, to each match line, a wavelength division multiplexed content optical signal comprising a plurality of wavelengths, each wavelength encoding one of N parallel content symbols. The method may further comprise demultiplexing, at each match line, the wavelength division multiplexed content optical signal to provide each of the N CAM cells of each match line with a respective content symbol. The method may further comprise providing, to each search line, a search optical signal comprising a different wavelength encoding one of N search symbols. The method may comprise providing each CAM cell of each match line with a respective search symbol from a respective search line. The method may further comprise comparing, at each CAM cell, a respective search symbol with a respective content symbol and providing an output optical signal that is responsive to the comparison. The method may further comprise combining the output optical signal from each of the N CAM cells of a match line to provide, for each match line, a wavelength division multiplexed response optical signal comprising a plurality of wavelengths, each encoding the outcome of the search operation on each match line.

The CAM cells may be arranged in rows and columns, each row associated with a match line, and each column associated with a search line.

Providing a wavelength division multiplexed content optical signal to each match line may comprise providing a wavelength division multiplexed content optical signal to a content optical signal waveguide.

Demultiplexing, at each match line, the wavelength division multiplexed content optical signal may comprise coupling a portion of the spectral content of the wavelength division multiplexed content signal associated with a respective content symbol from the content optical signal waveguide to the respective CAM cell.

Providing a search optical signal to each search line may comprise providing a search optical signal to a search optical signal waveguide coupled to a CAM cell of each match line to provide the same search symbol to each of the respective CAM cells.

Providing each CAM cell of each match line with a respective search symbol from a respective search line may comprise coupling a portion of the optical power of a respective search optical signal from a respective search signal waveguide to a respective CAM cell of each match line. The search optical signal may be divided equally between the respective CAM cells in the column.

Combining the output optical signal from each of the N CAM cells of a match line may comprise coupling the output optical signal from each of the N CAM cells of a match line to a response optical signal waveguide.

Comparing, at each CAM cell, a respective search symbol with a respective content symbol and providing an output optical signal may comprise adjusting the state of a modulating element of the CAM cell in dependence on the matching between the search symbol and the content symbol.

The method may further comprise demultiplexing a wavelength division multiplexed search optical signal comprising a plurality of wavelengths encoding the N parallel search symbols, to provide each search optical signal to a respective search line.

Features which are described in the context of separate aspects and embodiments of the invention may be used together and/or be interchangeable. Similarly, where features are, for brevity, described in the context of a single embodiment, these may also be provided separately or in any suitable sub-combination. Features described in connection with the device may have corresponding features definable with respect to the method(s), and vice versa, and these embodiments are specifically envisaged.

BRIEF DESCRIPTION OF DRAWINGS

In order that the invention can be well understood, embodiments will now be discussed by way of example only with reference to the accompanying drawings, in which.

Figure 1:
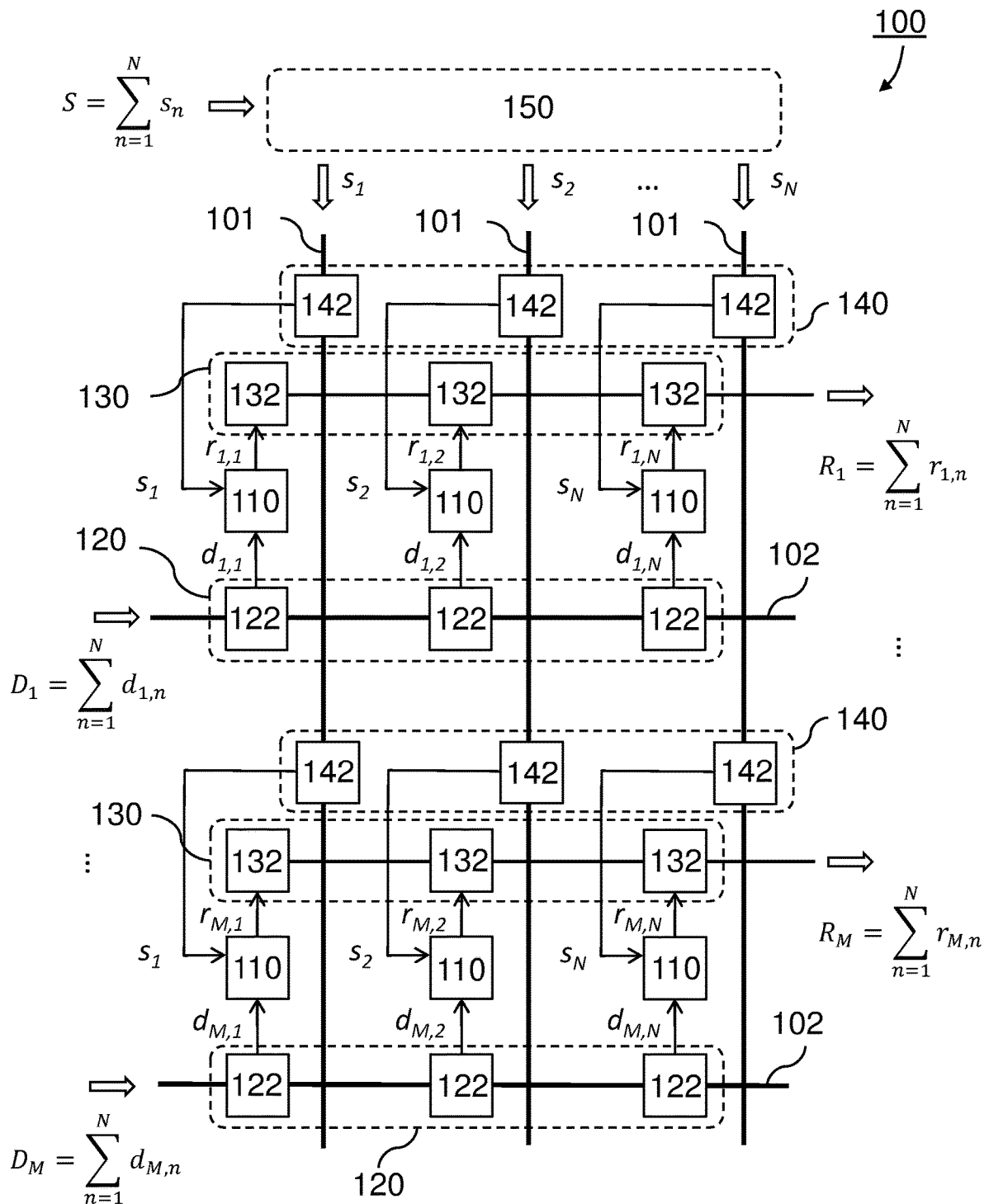
FIG. 1 shows a schematic diagram of a photonic content addressable memory array, according to an embodiment of the invention.

It should be noted that the figures are diagrammatic and may not be drawn to scale. Relative dimensions and proportions of parts of these figures may have been shown exaggerated or reduced in size, for the sake of clarity and convenience in the drawings. The same reference signs are generally used to refer to corresponding or similar features in modified and/or different embodiments.

DETAILED DESCRIPTION

FIG. 1 shows a photonic content addressable memory (CAM) array 100, according to an embodiment of the invention. The CAM array 100 can be implemented fully on-chip using photonic circuit components, such as optical waveguides, directional couplers, optical resonators etc. that can be produced using standard fabrication techniques, such as lithography and deposition, and standard photonic materials including but not limited to silicon, silicon nitride, or indium phosphide.

The CAM array 100 comprises a plurality (N) of search lines 101 and a plurality (M) of match lines 102, representing N columns and M rows of the CAM array 100. Only three search lines 101 and two match lines 102 are shown for clarity, however, the CAM array 100 is not limited in array size and can be scaled up to have any number N×M of search and match lines. Each of the N search lines 101 is configured to receive a search optical signal $s_n$ and provide that search optical signal $s_n$ to each match line 102 in the array 100. Each search optical signal $s_n$ comprises a different wavelength of light in encoding one of N search bits or symbols $A_n$, wherein n=1, 2, . . . , N. Each match line 102 is configured to receive the N search optical signals $s_n$ as well as a wavelength division multiplexed (WDM) content optical signal $D_m$. The WDM content optical signal $D_m$ comprises a plurality of wavelengths $\lambda_n$, each wavelength $\lambda_n$ encoding one of N parallel content symbols $B_{m,n}$, where m=1, 2, . . . , M. As such, each WDM content optical signal $D_m$ can be represented as the sum of N parallel content optical signals $d_{m,n}$, each with a different wavelength $\lambda_n$, according to $D_m = \Sigma_{n=1}^{N} d_{m,n}$. The search bits or symbols $A_n$ and the content bits or symbols $B_{m,n}$ can be encoded in the usual way, e.g. by amplitude modulation.

Each match line 102 comprises N photonic CAM cells 110, a content optical demultiplexer (DMUX) 120, a response multiplexer (MUX) 130, and a search coupler 140. The CAM cells 110 are arranged in rows and columns as shown, each row associated with a match line 102, and each column associated with a search line 101.

The content optical DMUX 120 is configured to demultiplex the WDM content optical signal $D_m$ and provide each CAM cell 110 with a content optical signal $d_{m,n}$ encoding a specific content symbol $B_{m,n}$. The search coupler 140 is configured to couple a portion of the optical power of the search optical signal $s_n$ in each search line 101 to a respective CAM cell 110 of the row, to thereby provide each CAM cell 110 in a column with the same specific search symbol $A_n$. Each CAM cell 110 is configured to compare a respective search symbol $A_n$ with a respective content symbol $B_{m,n}$ and provide an output optical signal $r_{m,n}$ that is responsive to the comparison. The wavelength of the content optical signal $d_{m,n}$ and the search optical signal $s_n$ content symbol that is provided to each CAM cell 110 is different to prevents or minimise unwanted optical phase dependence of the comparison result that may occur if the two wavelengths were the same.

The response multiplexer (MUX) 130 is configured to receive and combine the output optical signal $r_{m,n}$ from each CAM cell 110 in the match line 102/row to form a WDM response optical signal $R_m$. As such, each WDM response optical signal $R_m$ can be represented as the sum list of N parallel output optical signals $r_{m,n}$ encoding the outcome of the search operation on each match line, each with a different wavelength $\lambda_n$, according to $R_m = \Sigma_{n=1}^{N} r_{m,n}$.

The search optical signals $s_n$ can be derived from a WDM search optical signal S comprising a plurality of wavelengths encoding the N parallel search bit or symbols $A_n$. In this case, the CAM array 100 further comprises a search optical DMUX 150 configured to demultiplex the WDM search optical signal S and provide each search optical signal $s_n$ (encoding a respective search bit or symbol $A_n$) to a respective search line 101, as shown.

The WDM content signals $D_m$ represent stored data words to be searched, and the N search signals $s_n$ represent the search data word that is provided to the CAM array 100 and compared to the stored data words to return the best match(es). For example, the WDM content signals $D_m$ input to the match lines 102 may represent table addresses of M stored data words to be searched against the input search data word, and the WDM response optical signals $R_m$ output from the CAM array rows on the right of FIG. 1 return the output table address(es) of matching data words.

The content optical signals $d_{m,n}$ are multiplexed onto a single optical waveguide using different optical wavelengths $\lambda_n$ with no interference (i.e. WDM). This increases signal bandwidth by allowing different data streams to be sent to the CAM array 100 simultaneously and in parallel over a single optical waveguide, as long as the data streams are of unique wavelengths. In one example, a commercial femtosecond Erbium-doped fiber oscillator (C-fiber, Menlo Systems GmbH) can readily generate over 100 wavelength modes evenly distributed over a 75 nm spectral bandwidth, providing a single optical source from which the plurality of content and/or search optical signals $d_{m,n}$, $s_n$ at respective different wavelengths $\lambda_n$ can be extracted.

Figure 2:
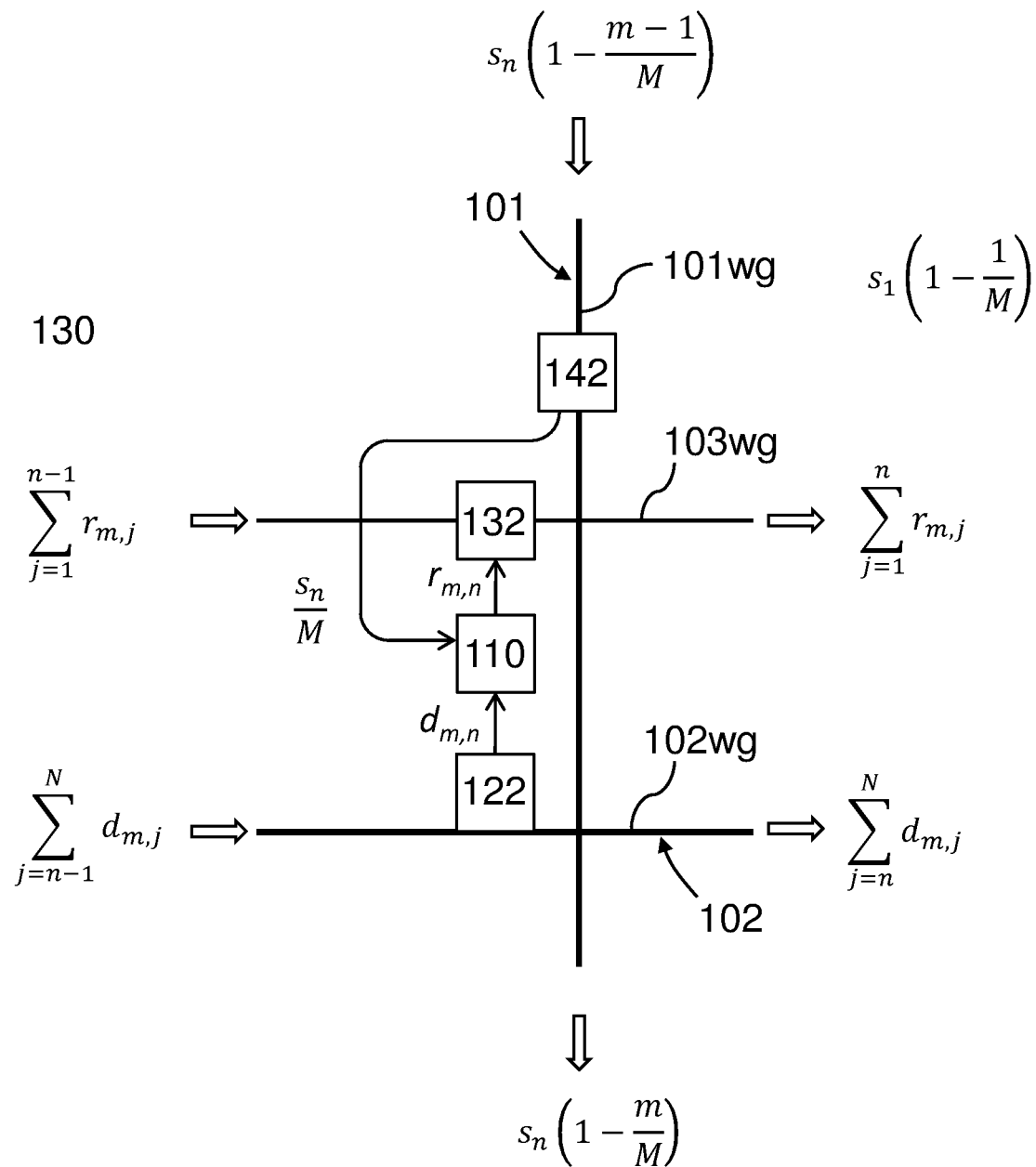
FIG. 2 shows a schematic diagram of an array unit of the array of FIG. 1.

FIG. 2 shows a schematic diagram of a unit cell of the CAM array 100 according to an embodiment. The content optical demultiplexer 120 comprises N content filters 122, each associated with a respective CAM cell 110, and the match line 102 comprises a content optical signal waveguide 102wg configured to communicate the WDM content signal $D_m$ to each content filter 122 in the row. The content filter 122 is configured to couple a portion of the spectral content (i.e. the content optical signal $d_{m,n}$) of the WDM content signal $D_m$ associated with a respective content symbol $B_{m,n}$ from the content optical signal waveguide 102wg to the respective CAM cell 110, as shown. As the spectral content associated with a respective content symbol $B_{m,n}$ is filtered/coupled out of the content optical signal waveguide 102wg with each successive content filter 122 in the row, the WDM content signal $D_m$ before and after the nth content filter 122 in a row is represented, respectively, by $\Sigma_{j=n-1}^{N} d_{m,j}$ and $\Sigma_{j=n}^{N} d_{m,j}$, as shown.

The search coupler 140 comprises N search couplers 142, each associated with a respective CAM cell 110 in a row, and the search line 101 comprises a search optical signal waveguide 101wg configured to communicate a respective search optical signal $s_n$ to each search coupler 142 in a respective column, thereby providing the same search symbol $A_n$ to each CAM cell 110 in the column, in parallel. The search coupler 142 is configured to couple a portion of the optical power of the search signal $s_n$ from the search optical signal waveguide 101wg to the respective CAM cell 110. In the embodiment shown, the search optical signal $s_n$ is distributed equally across each CAM cell 110 in the column, such that each CAM cell 110 receives a portion equal to $s_n/M$, as shown. In this case, as a fraction 1/M of the optical power is coupled out of the search optical signal waveguide 101wg by each successive search coupler 142 in the column, the search optical signal before and after the mth search coupler 142 is equal to $$s_n\left(1 - \frac{m-1}{M}\right) \text{ and } s_n\left(1 - \frac{m}{M}\right),$$

respectively, as shown.

The response multiplexer 130 comprises N response couplers 132, each associated with a respective CAM cell 110 in a row. Each response coupler 132 is configured to couple the output optical signal $r_{m,n}$ of a respective CAM cell 110 to a response optical signal waveguide 103wg. The response optical signal waveguide 103wg receives, successively, the output optical signals $r_{m,n}$ from each CAM cell 110 in the row. Accordingly, the WDM response optical signal $R_m$ before and after the nth response coupler 132 in a row is represented, respectively, by $\Sigma_{j=1}^{n-1} r_{m,j}$ and $\Sigma_{j=1}^{n-1} r_{m,j}$, as shown.

Figure 3:
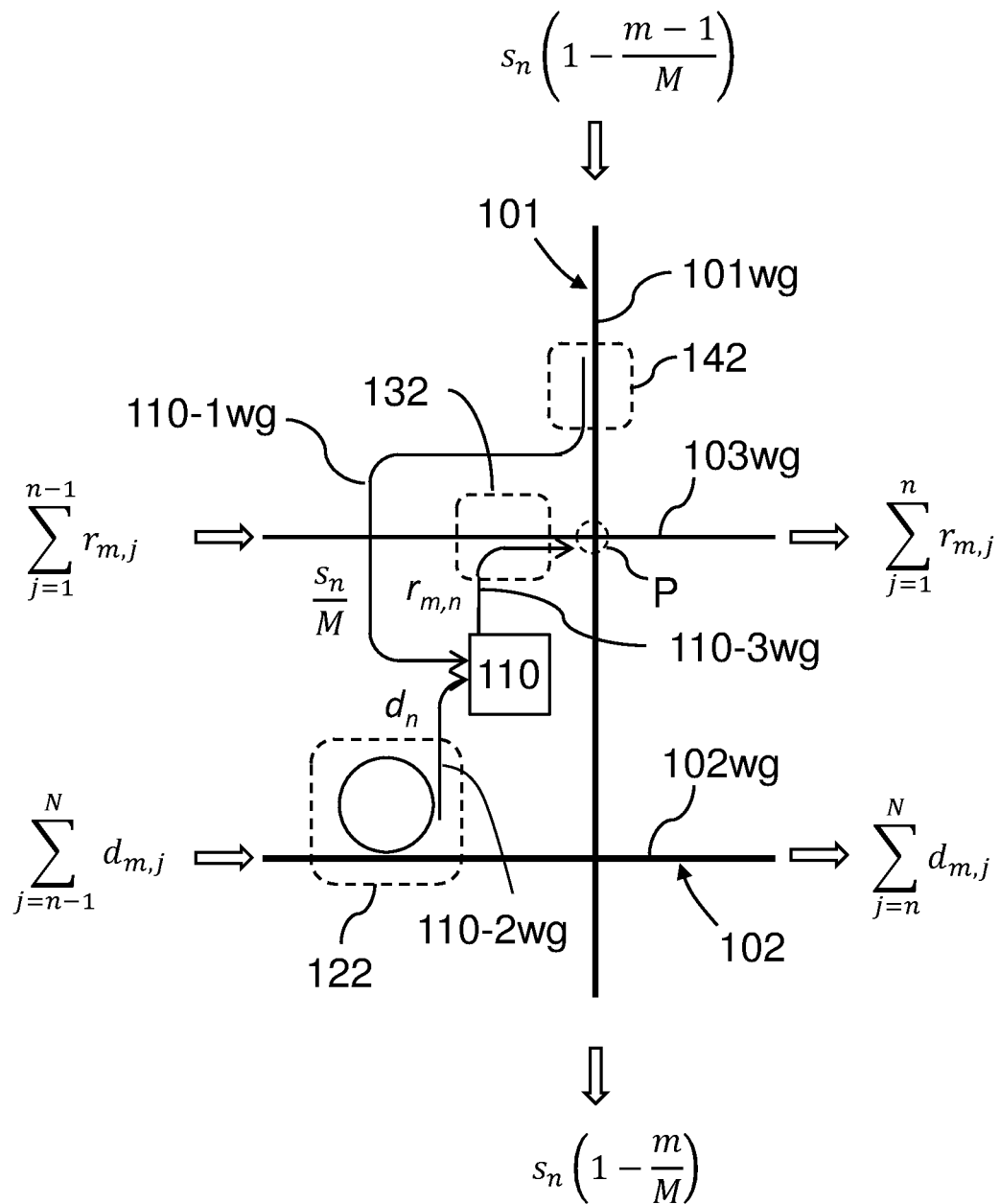
FIG. 3 shows another schematic diagram of an array unit of the array of FIG. 1 according to an embodiment.

FIG. 3 shows an embodiment of the CAM array unit cell in more detail. The CAM cell 110 comprises a first optical waveguide 110-wg1 configured to carry the search symbol $A_n$, a second optical waveguide 110-wg2 configured to carry the content symbol $B_{m,n}$, and third optical waveguide 110-wg3 configured to carry the output optical signal $r_{m,n}$. Both the search couplers 142 and the response couplers 132 are implemented by a directional coupler. In this case, each search coupler 142 is formed from a portion of the search optical signal waveguide 101wg and a portion of the first optical waveguide 110-wg1 which are substantially parallel, evanescently coupled and separated by a gap, as shown. Similarly, each response coupler 132 is formed from a portion of the response optical signal waveguide 103wg and a portion of the third optical waveguide 110-wg3 which are substantially parallel, evanescently coupled and separated by a gap, as shown.

Each content filter 122 comprises an optical resonator, which is implemented as a ring resonator, as shown. The optical resonator is evanescently coupled to, and separated by a gap from, both the content optical signal waveguide 102wg and the second optical waveguide 110-wg2. Each ring resonator 122 is configured to couple or transmit a specific resonant wavelength of light associated with a respective content symbol $B_{m,n}$ from the content optical signal waveguide $102wg$ to the second optical waveguide $110\text{-}wg2$, thereby acting as an optical filter, as is known in the art.

Figure 4:
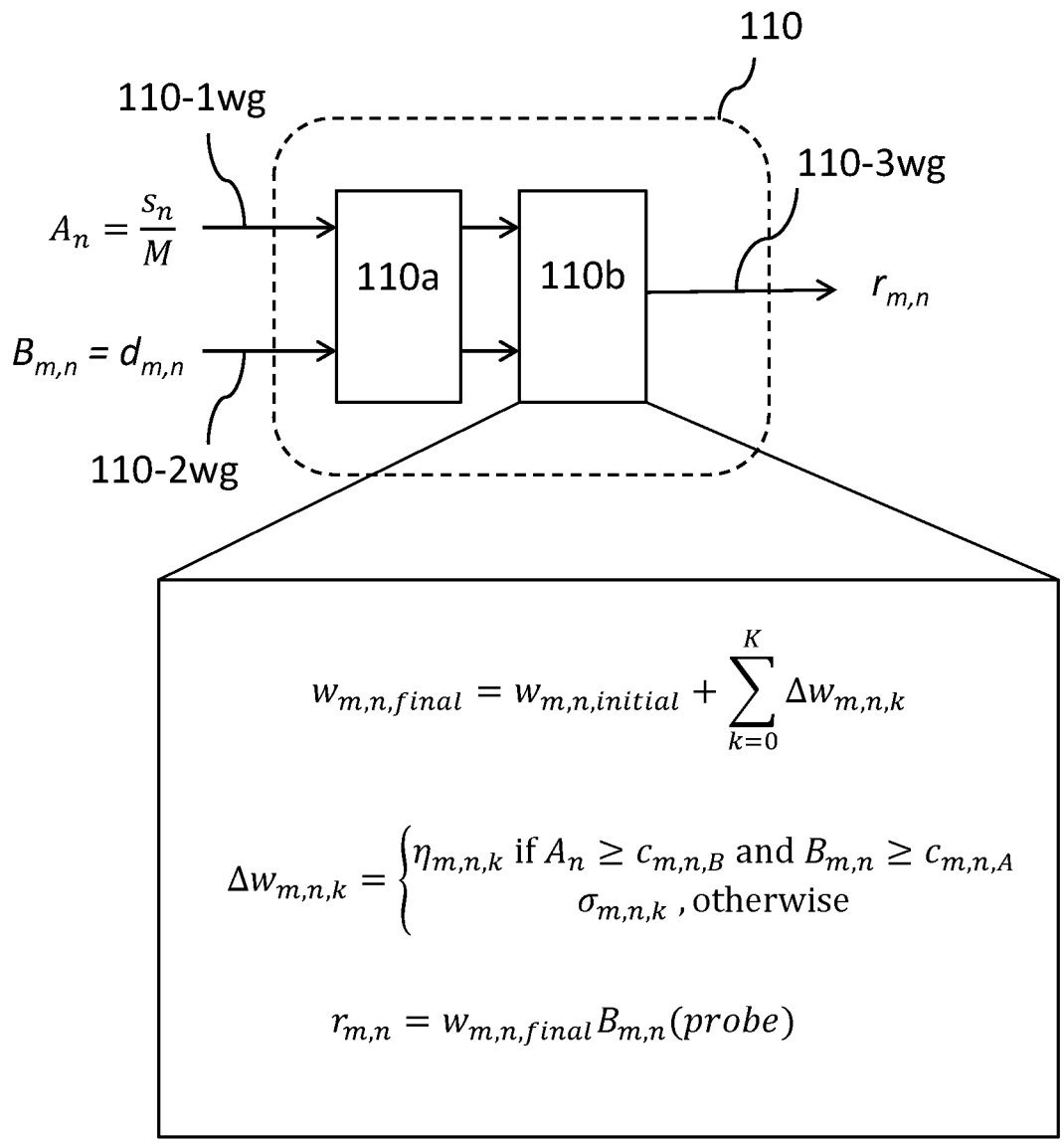
FIG. 4 shows a schematic diagram of a content addressable memory cell of the array of FIG. 1.

FIG. 4 shows a schematic diagram of a photonic CAM cell 110. The CAM cell 110 comprises an abstraction layer 110a and an associative layer 110b. The abstraction layer 110a routes the signals to the associative layer 110b and conditions the signals to ensure that the amplitudes, phases and/or wavelengths of the input content and search optional signals $A_n$, $B_{m,n}$ are properly set for the associative layer 110b, discussed below. The abstraction layer 110a may simply comprise routing waveguides, and/or they may comprise more complex photonic structures such as optical resonators, combiners/couplers, and MZI-type structures to filter and/or control the amplitude and phase of the signals provided to the associative layer 110b.

The associative layer 110b contains a memory or modulation element whose state changes responsive to a match between the search and content symbols $A_n$, $B_{m,n}$. The input-output relations of the associative layer 110b can be summarised by the equations that define the final memory weight of the memory element $w_{m,n,final}$ and its corresponding matching response $r_{m,n}$. An increment to the memory weight by $\Delta w_{m,n,k} = \eta_{m,n,k}$ occurs when the optical power/amplitude of the search symbol $A_n$ and content symbol $B_{m,n}$ (i.e. pump signals) are greater than or equal to the constants $c_{m,n,B}$ and $c_{m,n,A}$ respectively, upon kth input trials. Otherwise, the memory weight increases by a different value $\Delta w_{m,n,k} = \sigma_{m,n,k}$, as shown. $\sigma_{m,n,k}$ has a value less than $\eta_{m,n,k}$ and is preferably close to zero (so that substantially no change in memory state occurs). The final memory weight $w_{m,n,final}$ of the associative layer 110b is given by:

$$w_{m,n,final} = w_{m,n,initial} + \sum_{k=0}^{K} \Delta w_{m,n,k} \quad (1)$$

$$\Delta w_{m,n,k} = \begin{cases} \eta_{m,n,k} & \text{if } A_n \geq c_{m,n,B} \text{ and } B_{m,n} \geq c_{m,n,A} \\ \sigma_{m,n,k}, & \text{otherwise} \end{cases} \quad (2)$$

The memory weight corresponds to a transmission or absorption property of the memory element. A change in the memory weight modulates/modifies the transmission of the CAM cell 110 which can be detected upon subsequent probing of the match line 102 with a probe data word $D_M$(probe) according to $r_{m,n} = w_{m,n,final} B_{m,n}$ (probe), thereby enabling the determination of a match. Note that when probing with only the content data word, only the content symbols $B_{m,n}$ are provided to the CAM cells 110, and the first condition in equation 2 is never met such that probe signals do not substantially alter the memory weight (due to the relatively low optical power of the probe signals $D_M$(probe) compared to the preceding pump signals).

A typical CAM implementation involves only digital bits or combinations of bits, i.e. 0s and 1s, however, analogue data may also be used. As such, the search optical signals $s_n$, content optical signals $d_{m,n}$, and the output optical signal $r_{m,n}$ may in general be scaled by parameters $\alpha_n$, $\beta_{m,n}$ and $\gamma_{m,n}$ to account for both digital and analogue data and/or to denote the relevance of a particular bit to the system. The amplitude of the search optical signals $s_n$ and content optical signals $d_{m,n}$ can be scaled using photonic attenuating elements, as is known in the art.

In practice, multiple options exist to realize equations 1 and 2 in a hardware photonic CAM cell 110, with the components in abstraction layer 110a dependent on the specific configuration of the associative layer 110b. For example, certain photonic structures that can be implemented in the associative layer 110b may be phase dependent and others may be optical wavelength dependent—the abstraction layer 110a can therefore be configured to ensure that the amplitudes, optical phases and/or wavelengths of the input search and content optical signals are properly set for the associative layer 110b.

FIGS. 5(i) to (vi) show schematic diagrams of example implementations of the CAM cell 110. In each case, the solid arrows represent pump search and content signals (i.e. $A_n$ and $B_{m,n}$), and the dotted arrows represent the data word (content) probe signal ($B_{m,n}$(probe)). The associative layer 110b of the CAM cell 110 comprises a modulating (memory) element 110m as described above. In the examples shown, the memory element 110m is formed of or comprises a phase change material (PCM) which is switchable between at least two stable states, e.g. amorphous and crystalline, having a different refractive index and extinction coefficient in each state for a given wavelength of light. The PCM 110m is evanescently coupled to a waveguide of the associative layer 110b and is switchable in response to absorption of light above a threshold optical power, and the PCM 110m can incrementally change state between amorphous and crystalline states, e.g. partially crystallised, with each pump pulse/write iteration. In the present examples, the CAM cell 110 is configured to switch or partially switch the PCM 110m when there is coincident optical power from both search and content symbols $A_n$ and $B_{m,n}$ that couples to the PCM 110m. In this way, a ternary CAM functionality can be achieved by reducing/attenuating the optical power of a particular search symbol $A_n$ based on its extent of importance.

By way of example, considering digital symbols/bits of 0s and 1s encoded in the signal amplitude, the PCM-based associative layer 110b functions in a similar way to a XNOR logic gate. It is responsive to two matching input 1s, and can also detect two 0s by inverting the input search data word or content data word, i.e. by changing 0s to 1s and vice versa.

In a first mode of operation, two write iterations (i.e. sending both the search optical signals $s_n$ and WDM content optical signals $D_M$) are used, in which the (original) content data word is sent in the first write iteration and a toggled or inverted data word is sent in the second write iteration. For example, in a first write iteration a WDM content optical signal $D_M$ encoding the content data word "0110" is provided to a match line 102, and in the second iteration a WDM content optical signal $D_M$ encoding the inverted data word "1001" is provided to the match line 102. Each match line 102 is then probed using the respective WDM content optical signal $D_M$ encoding the original content data word 0110 to deduce the highest match. The highest match between the search and content symbols $A_n$ and $B_{m,n}$ will result in the probe signal $B_{m,n}$(probe) being modulated the most.

In a second mode of operation, the original and inverted content data words are provided to the CAM 100 at the same time enabling one-shot detection, by using two rows or match lines 102 of the CAM 100 for each data word, one being used for the original data word and the other for inverted data word. In this case, both rows/match lines 102 are probed and the resulting response signal is summed to deduce the highest match.

In both the first and second modes, the PCM 110m can be reset by providing a reset optical pulse with suitable optical power and duration, as is known in the art.

In a third mode of operation, the search and content optical signals are not provided to the CAM simultaneously, but are sent sequentially. In this case, the inverted content data words are provided to the CAM 100 at the same by using two rows/match lines 102 of the CAM 100 for each data word, as with the second mode. First, the WDM content optical signals $D_M$ are provided, but with sufficient optical power in each content symbol $B_{m,n}$ to switch the PCM (e.g. twice the optical power used in the first and second modes), then search optical signals $s_n$ are provided at the normal power (e.g. same as in modes 1 and 2). The response is then probed in the same way as in the first and second modes, by sending a low power data word probe signal $B_{m,n}$(probe) The more CAM cells 110 that are switched, the higher the matching response $R_{m,n}$ for the particular row/match line 102.

With reference again to FIG. 5, FIG. 5(*i*) illustrates an example associative layer 110*b* implemented as a waveguide-resonator structure comprising a ring resonator R1 with a layer of PCM 110*m* provided over a portion of the ring. A pump waveguide wg-pu receives both the search and content optical signals $A_n$, $B_{m,n}$ from the abstraction layer 110*a* and carries them to the location of the PCM 110*m* on ring resonator R1. The CAM cells 110 are configured such that the resonance wavelength of the ring resonator R1 initially overlaps with the probe signal $B_{m,n}$(probe) wavelength. When the PCM 110*m* switches or at least partially changes state, the resonance wavelength of R1 shifts such that the probe signal $B_{m,n}$(probe) wavelength is now off-resonance thereby modulating the output signal $r_{m,n}$. The abstraction layer 110*a* comprises a combiner C1 to combine the search and content optical signals $A_n$, $B_{m,n}$ from the first and second waveguides 110-1*wg*, 110-2*wg* and output the combined signal to the pump waveguide wg-pu of the association layer 110*b*. The abstraction layer 110*a* also comprises a waveguide-resonator structure in the form of a ring resonator R2 for coupling a probe signal $B_{m,n}$(probe) to a probe waveguide wg-pr, as described below.

For the pump step, the resonator R2 is set or configured such that the content optical signal $B_{m,n}$ is not on resonance with the resonator R2. Thus, the content optical signal $B_{m,n}$ does not couple to the resonator R2 but propagates and combines with the search optical signal $A_n$ at combiner C1 where it is passed to the associative layer 110*b*. When both the content and search signals $A_n$, $B_{m,n}$ have sufficient pump energy/optical power, the PCM 110*m* on the resonator R1 is switched thereby shifting the resonance of the resonator R1 away from the wavelength of $B_{m,n}$(probe) as described above.

For the probe step, the resonator R2 in the abstraction layer 110*a* is set, configured or modulated (e.g., electrically using heaters) such that the wavelength of probe signal $B_{m,n}$(probe) is on-resonance with the resonator R2. As such, when the probe signal $B_{m,n}$(probe) is sent it couples to the resonator R2 and to the probe waveguide wg-pr where it is guided to the associated layer 110*b* where it can couple to the resonator R1. If the PCM 110*m* has switched (i.e. the content and search signals $A_n$, $B_{m,n}$ match), the resonance wavelength of the resonator R1 in the associative layer 110*b* is shifted away from the wavelength of the probe signal $B_{m,n}$(probe), such that the probe signal $B_{m,n}$(probe) does not couple to the resonator R1 and the output $r_{m,n}$ of the associative layer 110*b* is high. Conversely, if the content and search signals $A_n$, $B_{m,n}$ do not have sufficient pump energy/optical power to switch the PCM 110*m* (i.e. they do not match), the probe signal $B_{m,n}$(probe) will be on-resonance with the resonator R1, such that the probe signal $B_{m,n}$(probe) couples to the resonator R1 and the output $r_{m,n}$ of the associative layer 110*b* is low.

Figure 5:
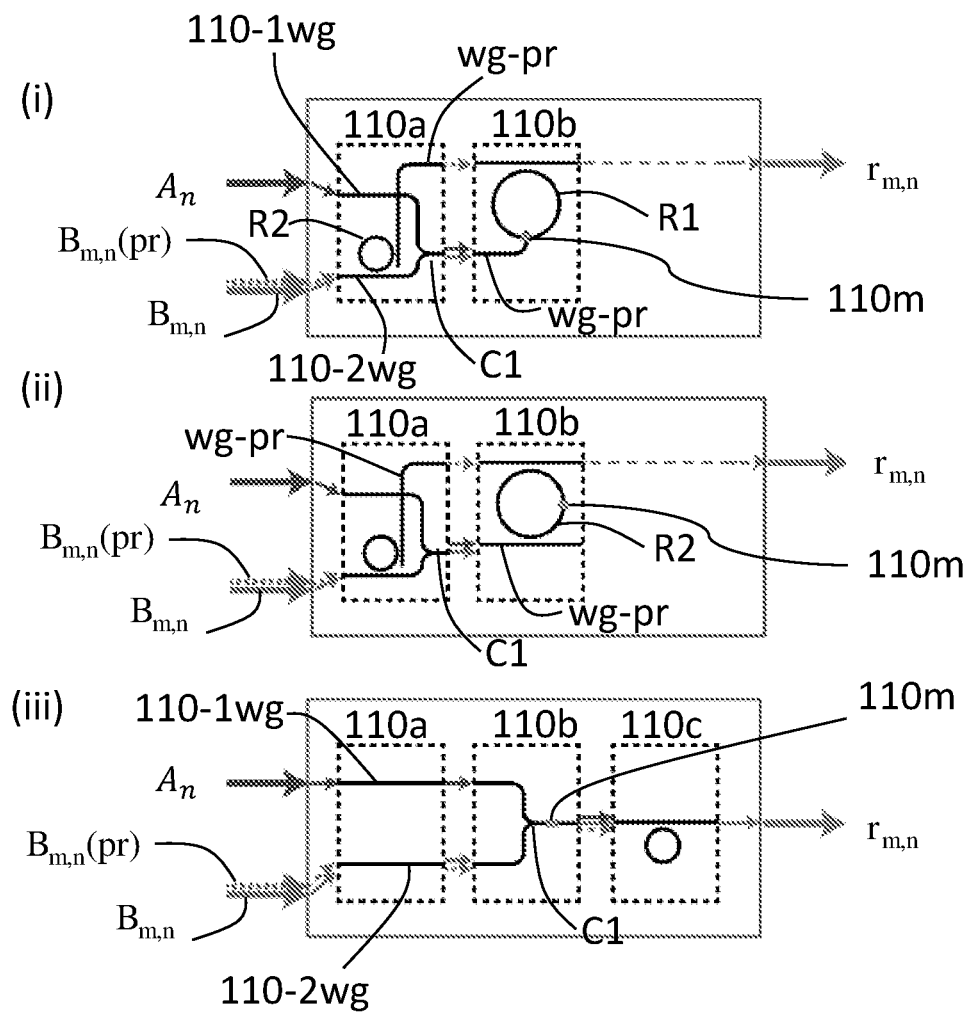
FIGS. 5(*i*) to 5(*vi*) show schematic diagrams of example implementations of the content addressable memory cell of FIG. 4.
Figure 5:
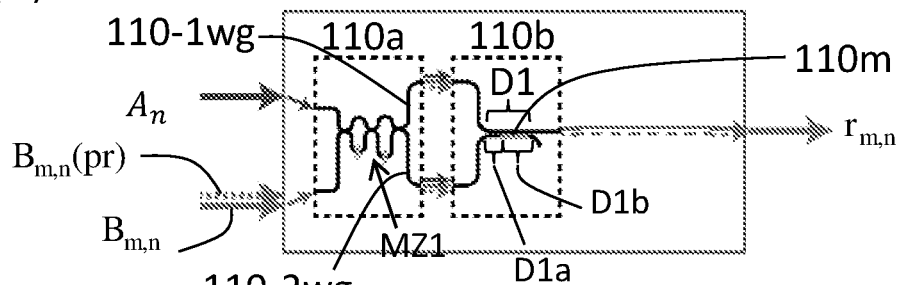
Figure 5:
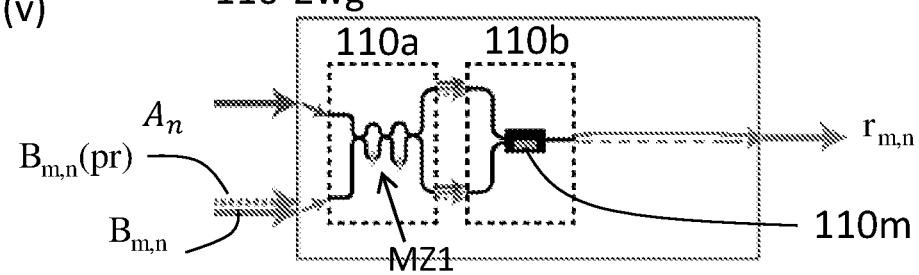
Figure 5:
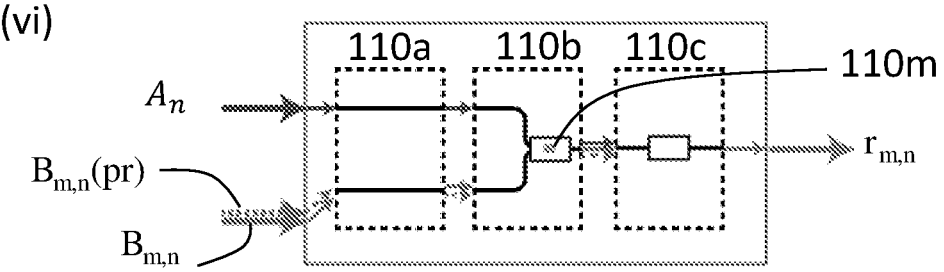

The embodiment in FIG. 5(*ii*) is the same as FIG. 5(*i*) but with a conventional waveguide-resonator structure in which the ring resonator R1 in the associative layer is not directly coupled to the pump waveguide wg-pu, but is evanescently coupled thereto as shown. The CAM 110 operates in the same way as described with FIG. 5(*i*).

In FIG. 5(*iii*) the associative layer 110*b* is implemented as an optical combiner/coupler C1 with a layer of PCM 110*m* provided over the output of the combiner C1 as shown. In this case, the PCM 110*m* switches only when both content and search signals are provided to the CAM 110 and couple to the PCM 110*m*. In this case, the state of the PCM 110*m* directly modulates the transmission of the probe signal $B_{m,n}$(probe) and thus the output signal level. A second abstraction layer 110*c* with a resonator structure R3 may optionally be provided to filter the search optical signal $A_n$ during the pump step and help reduce interference with the search optical signal $A_n$ propagating in the search line 101 at crossing point P in FIG. 3. However, this is not essential, as optical signals can propagate through the crossing point P unperturbed even at the same wavelength.

In FIG. 5(*iv*) the associative layer 110*b* is implemented as a directional coupler D1 comprising a layer of PCM 110*m* provided over a portion. The directional coupler D1 comprises a cascaded first and second directional coupler D1*a*, D1*b* formed from a portion of the first waveguide 110-1*wg* and the second waveguide 110-2*wg* in which the first waveguide 110-1*wg* and second waveguide 110-2*wg* are substantially parallel, evanescently coupled and separated by a gap. The modulating element 110*m* is evanescently coupled to the second waveguide 110-2*wg* in the second directional coupler D1*b* and arranged to modify a transmission or absorption characteristic of the second waveguide 110-2*wg* dependent on the state of the modulating element 110*m*. The first and second directional couplers D1*a*, D1*b* are arranged to accumulate optical intensity in the second waveguide 110-2*wg* at the interface between the first and second directional couplers D1*a*, D1*b* when both the first and second waveguides carry optical fields contemporaneously, i.e. when the optical fields carried by the first and second waveguides are substantially overlapping in time. Mach-Zehnder interferometer-like structures MZ1 in the abstraction layer 110*a* combine the search and content optical signals and enable precise control of signal amplitudes and phases of the search and content optical signals provided to the associative layer 110*b*.

In this manner, the net optical energy/intensity from both the search and content symbols is converged in the second waveguide of the first coupler D1*a*. This can cause a fractional volume of the PCM 110*m* to be switched to a different state (e.g. from a crystalline state to an amorphous state, or vice versa). With more converging optical fields (e.g. pulses), a larger volume of material of the modulating element 110*m* switches from crystalline to amorphous which modifies a transmission property of the CAM cell 110 and alters the output optical signal $r_{m,n}$ of the CAM cell 110 when probed.

In FIG. 5(*v*) the associative layer 110*b* is implemented as a multimode interferometer. In FIG. 5(*vi*) the associative layer 110*b* is implemented as a photonic crystal and/or inverse-designed structure.

Figure 6:
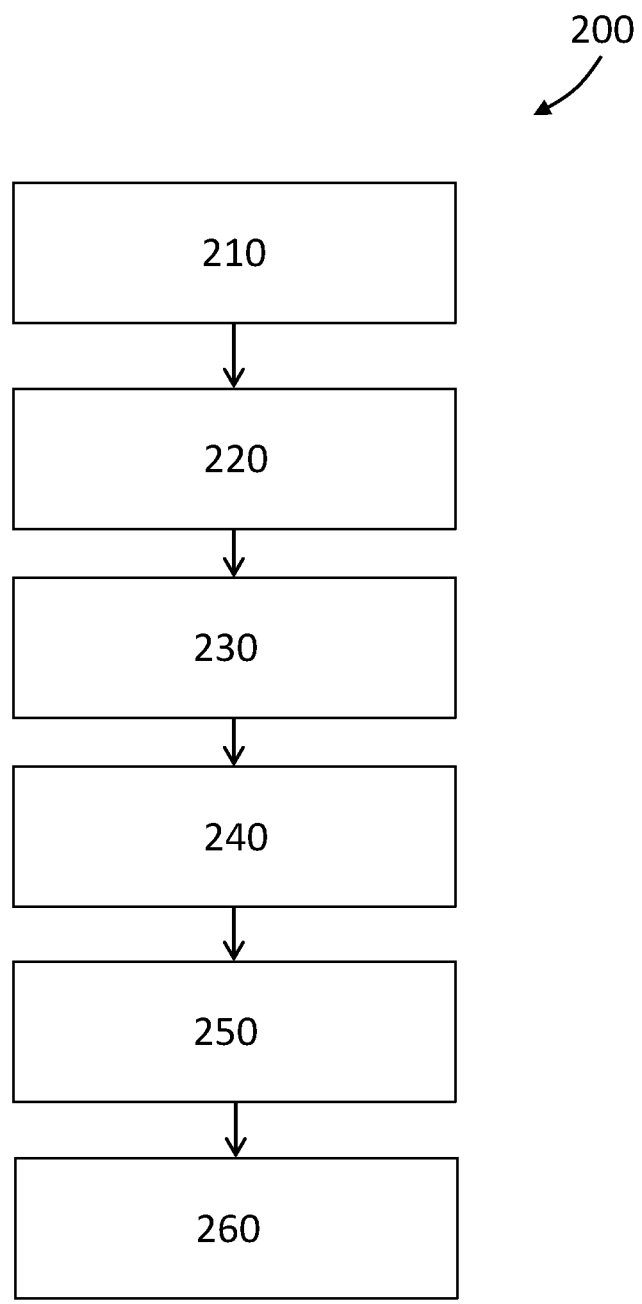
FIG. 6 shows a method of operating the CAM of FIG. 1.

FIG. 6 shows a method 200 of operating the CAM 100 according to an embodiment. In step 210, a WDM content optical signal $D_m$ is provided to each match line 102 of the CAM 100. This comprises providing a WDM content optical signal $D_m$ to a content optical signal waveguide $102wg$ that communicates WDM content optical signal $D_m$ to each of the N CAM cell 110 of the match line 102. Each WDM content optical signal $D_m$ encodes a separate data word of the CAM 100.

In step 220, the WDM content optical signal $D_m$ provided to each match line 102 is demultiplexed to provide each of the N CAM cells 110 of each match line 102 with a respective content symbol $B_{m,n}$. This comprises coupling a portion of the spectral content of the WDM content optical signal $D_m$ associated with a respective content symbol $B_{m,n}$ from the content optical signal waveguide $102wg$ to the respective CAM cell 110.

In step 230, a search optical signal $s_n$ is provided to each search line 101 of the CAM 100. Each search optical signal $s_n$ comprises a different wavelength encoding one of N search symbols $A_n$. This step comprises providing a search optical signal $s_n$ to a search optical signal waveguide $101wg$ which is coupled to one CAM cell 110 of each match line 102 so as to provide the same search symbol $A_n$ to each of the respective CAM cells 110. Step 230 may optionally comprise demultiplexing a WDM search optical signal S comprising the plurality of wavelengths encoding the N parallel search symbols $A_n$, to provide each search optical signal $s_n$ to the respective search line 101.

In step 240, each CAM cell 110 of each match line 102 is provided with a respective search symbol $A_n$ from a respective search line 101 in parallel. This comprises coupling a portion of the optical power of a respective search optical signal $s_n$ from a respective search signal waveguide $101wg$ to the respective CAM cell 110 of each match line 102.

In step 250, each CAM cell 110 compares a respective search symbol $A_n$ with a respective content symbol $B_{m,n}$ and provides an output optical signal $r_m$ that is responsive to the comparison. This comprises adjusting the state of a modulating element $110m$ of the CAM cell 110 in dependence on the matching between the search symbol $A_n$ and the content symbol $B_{m,n}$.

In step 260, the output optical signal $r_m$ from each of the N CAM cells 110 of a match line 102 is combined to provide, for each match line 102, a WDM response optical signal $R_m$ comprising a plurality of wavelengths each encoding the outcome of the search operation on each match line 102. This comprises coupling the output optical signal $r_m$ from each of the N CAM cells 110 of a match line 102 to a response optical signal waveguide $103wg$.

Applications of CAM

Although the CAM 100 has been described above in the context of search applications, it will be appreciated that the invention is not limited to search applications. There are in fact a myriad of potential applications for an all-optical CAM, some of which are listed below. In all cases, the operation of a CAM is based on the comparison of symbols or bits, which are referred to generally as content and search symbols/bits.

A) Basic Search Operations
Router address lookup: Internet routers search a lookup table to find the appropriate port to output data packets to. A CAM helps a router perform repeated functions very fast, preventing or minimising network congestion.
Access memory cache in central processing unit (CPU): A CAM can be implemented in CPU fully associative cache controllers, translation lookaside buffers (TLB), and/or branch history/prediction table (BHT).
Logic evaluation in reconfigurable computing: A CAM can be implemented in a Programmable Logic array (PLAs). For example, a Field Programmable Logic Array (FPGA) uses a lookup table (LUT) to implement/evaluate a logic function. It is from the LUTs that the logic blocks in PLAs search and receive information about their input-output relation.

B) Information Storage Retrieval, and Manipulation
Data retrieval (e.g. including cross retrieval, erasing, gap closing and preference). Sorting, merging, ordering, collating data. Library and catalog search files.
Associative rule mining. Discover interesting relations between variables in large databases, data mining.
Locality sensitive hashing (LSH), term frequency-inverse document frequency (TF-IDF, implies how important a word is to a document), data-intensive workloads.
Uncover inherent parallelism in symbolic processing and information retrieval systems.
Comprehensive search and analysis of complex unstructured data streams of list patterns (e.g., in graph databases). E.g., a graph database transfers data into nodes, and its relationships into edges. Process graphs with lots of metadata (data that provides information about other data). Can discover interesting business and research insights by processing them:
Search for similarities and spatiotemporal correlation in data (e.g., adjacency matrix). Access information in memory through 'activation' from closely related concepts.
Detect anomalies, e.g. in tree-based models (random forests, business rule management systems).
Convert data from one form to another: Language translation, code conversion, translation of mnemonic operation codes to machine codes in program assembly operations.
Auto-association (Hopfield memory): Retrieve information when presented only part of it, e.g. to correctly yield an entire memory from any subpart of sufficient size; fill out missing or corrupted pieces of information, e.g. map noisy 'A' image to a clean 'A' image.
Hetero-association (bi-direction associative memory): Similar to embedding vectors in computer programming, i.e. categorical variables are mapped to a different vector, e.g. to map 'Tehran' to 'City'
Abstract machines or implementations: E.g. automatons automata automatically follow/respond to a sequence of operations/instructions stored in a lookup table/state transition table. Examples include regular expression matching for network security intrusion and definable inexact pattern matching in a Levenstein automata for genome sequencing.

C) Information Compression
Dimensionality reduction. Memorize and reconstruct patterns.

D) Fast Arithmetic Computations
Carry-free arithmetic operations: Using conventional carry-propagation schemes, computation speed is limited by the carry propagation sequential operation. A CAM can be used to implement a modified signed digit (MSD) parallel method (Ha. Berlin and Li, Yao, 'Parallel modified signed-digit arithmetic using an optoelectronic shared content-addressable-memory processor' Apl. Opt. 33 pp. 3647-3648 (1994)).
Matrix multiplication (especially sparse matrix multiplication).

E) Neural Network Implementations
Hopfield network, Boltzmann machines/restricted Boltzmann machines, Ising spin glasses, Hamming network, Bidirectional associative memory, Cellular neural network, Spiking neural network.

F) Combinatorial Optimization

Travelling salesman problem (Hopfield, J. and Tank, D. W. 'Computing with neural circuits: A model' Science 233 4764 (1986)).

G) Mathematical System Solutions

Game playing, theorem proving, function optimization, solution of elliptic partial differential equations, determination of critical paths through a graph, interpolation, solution of linear equations, calculations of inverses and eigenvalues of matrices, correlation and autocorrelation, numerical solution of systems of ordinary and partial differential equations, orbital track calculations, hydrodynamics, heat flow, diffusion (Hanlon, A. G., 'Content-addressable and associative memory systems: A survey,' IEEE Trans. Comput. EC-15 4 (1966)).

H) Currently Commercialized CAM Products

Ethernet Switch FM5000, FM 6000 (Intel Inc.), Automata processor (Micron Technology Inc.), NSEx512 (NetLogic Microsystems Inc.), Ayama 1/20000, Sahasra 5000 (Cypress Semiconductor Corp), ATMCAM (Music Semiconductors Inc.), SiberCAM (SiberCore Technologies Inc.), 98TX1100 (Marvell Technology Group Ltd.), XAPP1151 (Xilinx Inc.), R8A20410BG TCAM (Renesas Technology).

From reading the present disclosure, other variations and modifications will be apparent to the skilled person. Such variations and modifications may involve equivalent and other features which are already known in the art, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination.

For the sake of completeness it is also stated that the term "comprising" does not exclude other elements or steps, the term "a" or "an" does not exclude a plurality, and any reference signs in the claims shall not be construed as limiting the scope of the claims.

The invention claimed is:

1. A photonic content addressable memory (CAM), comprising:

N search lines, wherein each search line is configured to receive a search optical signal, each search optical signal comprising a different wavelength encoding one of N parallel search symbols; and a plurality of match lines, wherein each match line is configured to receive:

a wavelength division multiplexed content optical signal comprising a plurality of wavelengths, each wavelength encoding one of N parallel content symbols; and the N search optical signals from the N search lines, and wherein each match line comprises:

N photonic CAM cells, each configured to compare a respective search symbol with a respective content symbol and provide an output optical signal that is responsive to the comparison; and a content optical demultiplexer, configured to demultiplex the wavelength division multiplexed content optical signal and provide each CAM cell with the respective content symbol.

2. The content addressable memory of claim 1, wherein each match line further comprises a response multiplexer, configured to combine the output optical signal from each of the N CAM cells to form a wavelength division multiplexed response optical signal.

3. The content addressable memory of claim 1, wherein each match line comprises a content optical signal waveguide, configured to communicate the wavelength division multiplexed content signal to the content optical demultiplexer.

4. The content addressable memory of claim 1, wherein the content optical demultiplexer comprises N content filters, each configured to couple a portion of the spectral content of the wavelength division multiplexed content signal associated with a respective content symbol to the respective CAM cell.

5. The content addressable memory of claim 4, wherein each content filter comprises an optical resonator, optionally or preferably, a ring resonator.

6. The content addressable memory of claim 1, wherein each search line comprises a search optical signal waveguide, each configured to communicate a respective search optical signal to each match line.

7. The content addressable memory of claim 6, wherein each search optical signal waveguide is coupled to a CAM cell of each match line to provide the same search symbol to each of the respective CAM cells.

8. The content addressable memory of claim 6, wherein each match line further comprises N search couplers, each search coupler configured to couple a portion of the optical power in a respective search optical signal waveguide to a respective CAM cell; and, optionally or preferably, wherein each search coupler is coupled between a respective search optical signal waveguide and a respective CAM cell.

9. The content addressable memory of claim 8, wherein each search coupler comprises a directional coupler formed from a portion of the search optical signal waveguide and a portion of an optical waveguide configured to provide a respective search symbol to a respective CAM cell.

10. The content addressable memory of claim 1, further comprising a search optical demultiplexer, wherein the search optical demultiplexer is configured to demultiplex a wavelength division multiplexed search optical signal comprising a plurality of wavelengths encoding the N parallel search symbols, to provide each search line with a respective search optical signal.

11. The content addressable memory of claim 2, wherein each match line comprises a response optical signal waveguide configured to receive the response optical signal from the response multiplexer.

12. The content addressable memory of claim 11, wherein the response multiplexer comprises N response couplers, each response coupler configured to couple the output optical signal of a respective CAM cell to the response optical signal waveguide; and, optionally or preferably, wherein each response coupler is coupled between the response optical signal waveguide and a respective CAM cell.

13. The content addressable memory of claim 12, wherein each response coupler comprises a directional coupler formed from a portion of the response optical signal waveguide and a portion of an optical waveguide configured to provide the output optical signal from a respective CAM cell.

14. The content addressable memory of claim 1, wherein each CAM cell comprises a modulating element that modifies a transmission property of the CAM cell depending on the state of the modulating element.

15. The content addressable memory of claim 14, wherein each CAM cell is configured to adjust the state of the modulating element in dependence on a matching between the search symbol and the content symbol.

16. The content addressable memory of claim 15, wherein each CAM cell comprises:
- a first optical waveguide configured to carry the search symbol;
- a second optical waveguide configured to carry the content symbol;
- a cascaded first and second directional coupler formed from a portion of the first waveguide and second waveguide, in which the first waveguide and second waveguides are substantially parallel, evanescently coupled and separated by a gap;
- wherein the modulating element is evanescently coupled to the second waveguide in the second directional coupler and is arranged to modify a transmission or absorption characteristic of the second waveguide dependent on the state of the modulating element; and
- wherein the state of the modulating element is adjustable between a first and second state by an optical field carried by the first and/or second waveguide.

17. The content addressable memory of claim 14, wherein the modulating element comprises a phase change material.

18. The content addressable memory of claim 1, wherein the CAM cell is configured as a binary CAM cell, a ternary CAM cell, or an analogue CAM cell.

19. A method of operating a photonic content addressable memory (CAM) comprising N search lines and a plurality of match lines, each match line having N photonic CAM cells, the method comprising:
- providing, to each match line, a wavelength division multiplexed content optical signal comprising a plurality of wavelengths, each wavelength encoding one of N parallel content symbols;
- demultiplexing, at each match line, the wavelength division multiplexed content optical signal to provide each of the N CAM cells of each match line with a respective content symbol;
- providing, to each search line, a search optical signal comprising a different wavelength encoding one of N search symbols:
- providing each CAM cell of each match line with a respective search symbol from a respective search line; and
- comparing, at each CAM cell, a respective search symbol with a respective content symbol and providing an output optical signal that is responsive to the comparison.

20. The method of claim 19 further comprising combining the output optical signal from each of the N CAM cells of a match line to provide, for each match line, a wavelength division multiplexed response optical signal comprising a plurality of wavelengths each encoding the outcome of the search operation on each match line.

* * * * *